US012770982B2

(12) United States Patent
Sato et al.

(10) Patent No.: US 12,770,982 B2
(45) Date of Patent: Oct. 20, 2026

(54) BATTERY WIRING MODULE

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Maya Nakasuka, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 718 days.

(21) Appl. No.: 17/924,087

(22) PCT Filed: May 18, 2021

(86) PCT No.: PCT/JP2021/018757
§ 371 (c)(1),
(2) Date: Nov. 8, 2022

(87) PCT Pub. No.: WO2021/241324
PCT Pub. Date: Dec. 2, 2021

(65) Prior Publication Data

US 2023/0178841 A1 Jun. 8, 2023

(30) Foreign Application Priority Data

May 25, 2020 (JP) ................................ 2020-090491

(51) Int. Cl.
*H01M 50/50* (2021.01)
*H01M 50/298* (2021.01)
*H01M 50/507* (2021.01)

(52) U.S. Cl.
CPC ....... *H01M 50/507* (2021.01); *H01M 50/298* (2021.01)

(58) Field of Classification Search
None
See application file for complete search history.

(56) References Cited

U.S. PATENT DOCUMENTS

2016/0133907 A1 5/2016 Shitamichi et al.
2017/0365827 A1* 12/2017 Okada .................. H01M 50/50
2018/0219202 A1 8/2018 Okazaki et al.

FOREIGN PATENT DOCUMENTS

JP 2012-155948 A 8/2012
JP 2017-098043 A 6/2017
JP 2019-207825 A 12/2019

OTHER PUBLICATIONS

Machine translation of JP 2017098043 A.*
International Search Report issued on Jul. 13, 2021 for WO 2021/241324 A1 (4 pages).

* cited by examiner

*Primary Examiner* — Jonathan G Leong
*Assistant Examiner* — Tony S Chuo
(74) *Attorney, Agent, or Firm* — Venjuris, P.C.

(57) ABSTRACT

An aspect of this disclosure is to provide a battery wiring module that enables the case to stably hold bus bars. A battery wiring module (10) according to an aspect of this disclosure includes a plate-shaped bus bar (11) to be connected to a secondary battery (BT); and a case (12) that holds the bus bar (11). Also, the case (12) includes a holding portion (33) that holds the bus bar (11), and a regulating portion (34) that regulates rotation of the bus bar (11) about the holding portion (33) when the bus bar (11) is viewed in the plate thickness direction of the bus bar (11), i.e., in the height direction (Z).

8 Claims, 3 Drawing Sheets

BATTERY WIRING MODULE

CROSS REFERENCE TO RELATED APPLICATIONS

This application is a national phase of PCT application No. PCT/JP2021/018757, filed on 18 May 2021, which claims priority from Japanese patent application No. 2020-090491, filed on 25 May 2020, all of which are incorporated herein by reference.

TECHNICAL FIELD

The present disclosure relates to a battery wiring module.

BACKGROUND

As disclosed in Patent Document 1, for example, in a vehicle such as an electric automobile or a hybrid automobile, a battery wiring module is mounted to a high-voltage secondary battery that is mounted as a travelling drive power source. The battery wiring module includes a plate-shaped bus bar connected to the secondary battery and a case that holds the bus bar.

PRIOR ART DOCUMENT

Patent Document

Patent Document 1: JP 2015-002164 A

SUMMARY OF THE INVENTION

Problems to be Solved

The inventors of the present invention have studied how the bus bar is stably held in the case in such a battery wiring module described above.

An aspect of this disclosure aims to provide a battery wiring module that enables the case to stably hold a bus bar.

Means to Solve the Problem

A battery wiring module according to this disclosure is a battery wiring module including a plate-shaped bus bar to be connected to a secondary battery and a case that holds the bus bar, in which the case includes a holding portion that holds the bus bar, and a regulating portion that regulates rotation of the bus bar about the holding portion when the bus bar is viewed in the plate thickness direction of the bus bar.

Effect of the Invention

According to this disclosure, it is possible to provide a battery wiring module that enables the case to stably hold a bus bar.

DETAILED DESCRIPTION TO EXECUTE THE INVENTION

Figure 1:
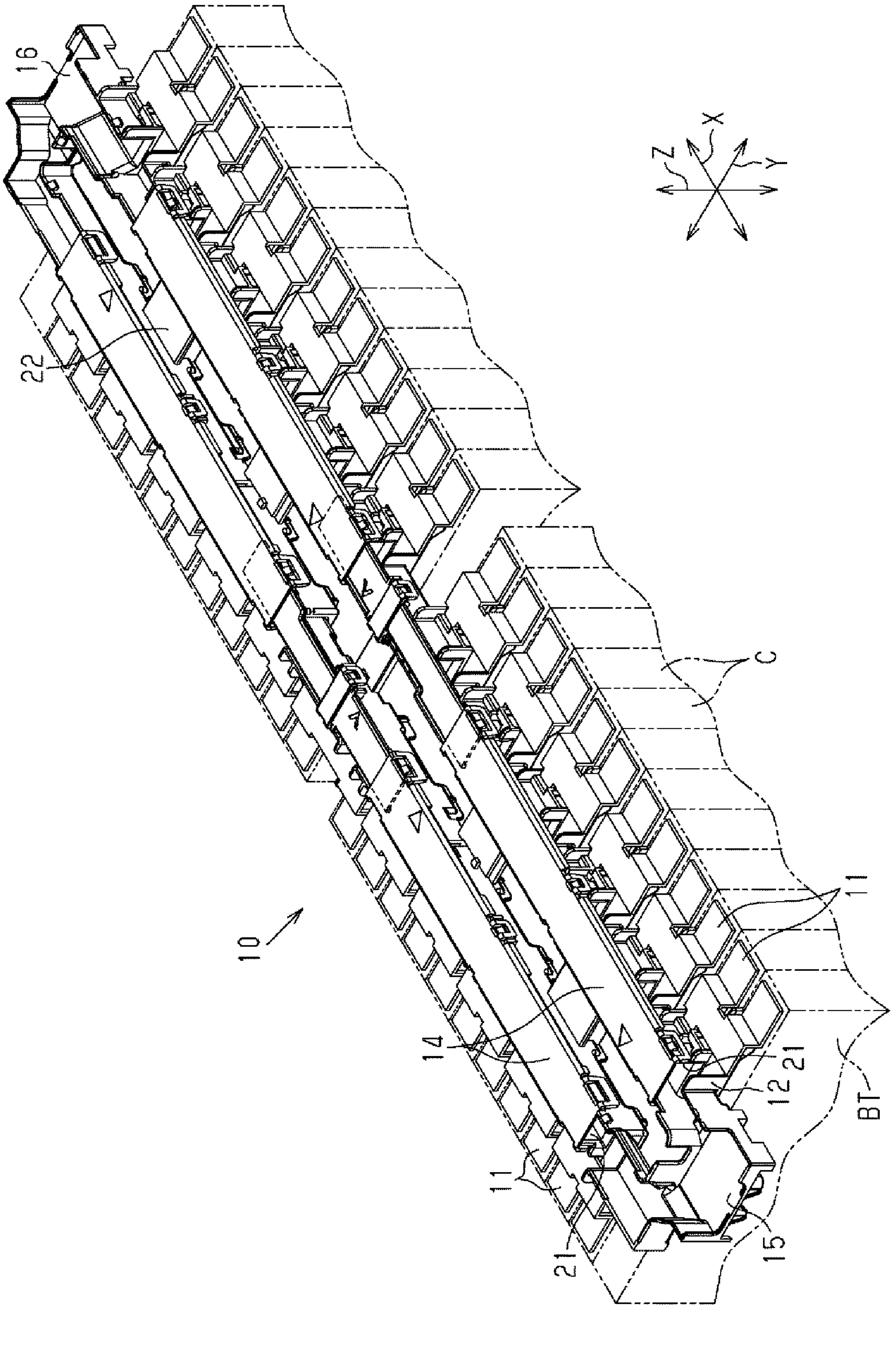
FIG. 1 is a perspective view of a battery wiring module according to an embodiment.

Description of Embodiments of the Present Disclosure

Firstly, embodiments of the present disclosure will be listed and described.

[1] A battery wiring module according to this disclosure is a battery wiring module including a plate-shaped bus bar to be connected to a secondary battery, and a case that holds the bus bar, in which the case includes a holding portion that holds the bus bar, and a regulating portion that regulates rotation of the bus bar about the holding portion when the bus bar is viewed in a plate thickness direction of the bus bar.

According to this configuration, rotation of the bus bar about the holding portion when the bus bar is viewed in the plate thickness direction thereof can be inhibited by the regulating portion, thus suppressing rattling of the bus bar. Therefore, the case can stably hold the bus bar.

[2] The case includes a seat portion on which the bus bar is placed, the regulating portion extend from the seat portion, and the regulating portion is configured to be capable of coming into contact with the bus bar in a direction extending along a plate surface direction of the bus bar.

According to this configuration, when the regulating portion that extends from the seat portion comes into contact with the bus bar in the direction that extends in the plate surface direction of the bus bar, rotation of the bus bar about the holding portion can be regulated.

[3] The case includes a wire insertion portion through which an electric wire to be electrically connected to the bus bar is passed, the wire insertion portion includes a bottom wall portion, and a first side wall portion and a second side wall portion that extend from the bottom wall portion and face each other in a width direction of the wire insertion portion, the seat portion is provided outside the first side wall portion in the width direction, and the seat portion is not provided with a wall that surrounds the bus bar placed on the seat portion.

This configuration is advantageous for reducing the weight of the case because no wall, which surrounds the bus bar placed on the seat portion, is provided. Also, even when a wall that surrounds the bus bar placed on the seat portion is not provided, the bus bar can be stably held by the holding portion and the regulating portion of the case without rattling.

[4] The secondary battery includes a plurality of battery cells that are provided in parallel in one direction, the bus bar includes a placement portion placed on the seat portion, and a first extension portion and a second extension portion that extend from the placement portion, the first extension portion and the second extension portion are provided in parallel along a direction in which the battery cells are provided in parallel, the first extension portion includes a first connection portion that is connected to one of the battery cells that are adjacent to each other, the second extension portion includes a second connection portion that is connected to the other of the battery cells that are adjacent to each other, and the regulating portion is configured to be capable of coming into contact with at least one of the first extension portion and the second extension portion.

According to this configuration, when the regulating portion that extends from the seat portion comes into contact with at least one of the first extension portion and the second extension portion, rotation of the bus bar about the holding portion can be regulated.

[5] The regulating portion is located between the first extension portion and the second extension portion.

According to this configuration, when the regulating portion located between the first extension portion and the second extension portion of the bus bar comes into contact with at least one of the first extension portion and the second extension portion, rotation of the bus bar about the holding portion can be regulated.

[6] The first side wall portion includes an opening portion for passing the electric wire to the bus bar side, the holding portion is provided on the first side wall portion so as to be aligned with the opening portion in a lengthwise direction of the wire insertion portion, the first extension portion is located outside the opening portion in the width direction, the second extension portion is located outside the holding portion in the width direction, and the regulating portion is configured to be capable of coming into contact with the first extension portion.

According to this configuration, because the regulating portion comes into contact with the first extension portion located farther away from the holding portion, it is possible to further suppress rattling of the bus bar in the direction in which the bus bar rotates about the holding portion.

Details of Embodiments of the Present Disclosure

Specific examples of a battery wiring module according to the present disclosure will be described below with reference to the drawings. In the drawings, some of the components may be shown exaggerated or simplified for the sake of convenience of description. In addition, the dimensional ratios of the components may be different in each of the drawings. Being "orthogonal" as used herein includes not only being strictly orthogonal, but also being generally orthogonal, as long as the actions and effects of the present embodiment can be achieved. Note that the present invention is not limited to these examples, and is defined by the claims, and all changes that come within the meaning and range of equivalency of the claims are intended to be embraced therein.

As shown in FIG. 1, a battery wiring module 10 according to an embodiment of the present disclosure is attached to a secondary battery BT that is mounted in an electric automobile, a hybrid automobile, or the like. The secondary battery BT supplies power to a travelling motor (not shown) of the vehicle. Also, the secondary battery BT is supplied with power from the travelling motor or a power generation motor in accordance with a charge state and a driving state of the vehicle.

The secondary battery BT includes a plurality of battery cells C. The secondary battery BT has a substantially rectangular parallelepiped shape as a result of the plurality of battery cells C being aligned in one direction, for example. The battery wiring module 10 is mounted on one side surface of the secondary battery BT. Note that the following description will be given assuming that the surface of the secondary battery BT on which the battery wiring module 10 is mounted is the upper surface of the secondary battery BT, and the battery wiring module 10 side of the secondary battery BT is upward. In addition, an X axis from among XYZ axes in the drawings that are orthogonal to one another represents the longitudinal direction X of a case 12 of the battery wiring module 10, the Y axis represents the width direction Y of the case 12, and the Z axis represents the height direction Z of the case 12. The battery cells C are provided in parallel along the longitudinal direction X of the battery wiring module 10.

Figure 2:
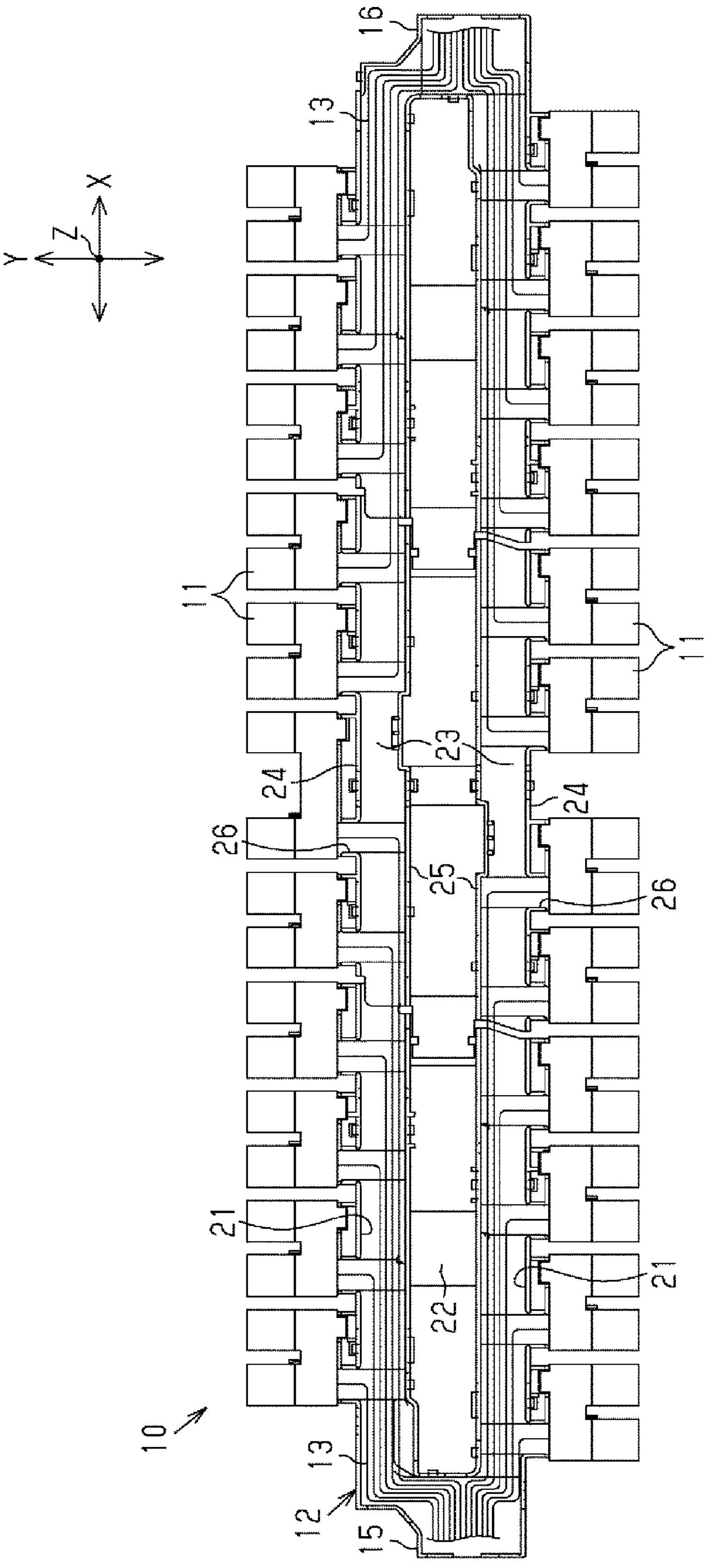
FIG. 2 is a plan view showing the battery wiring module shown in FIG. 1 in a state where a cover is removed.
Figure 4:
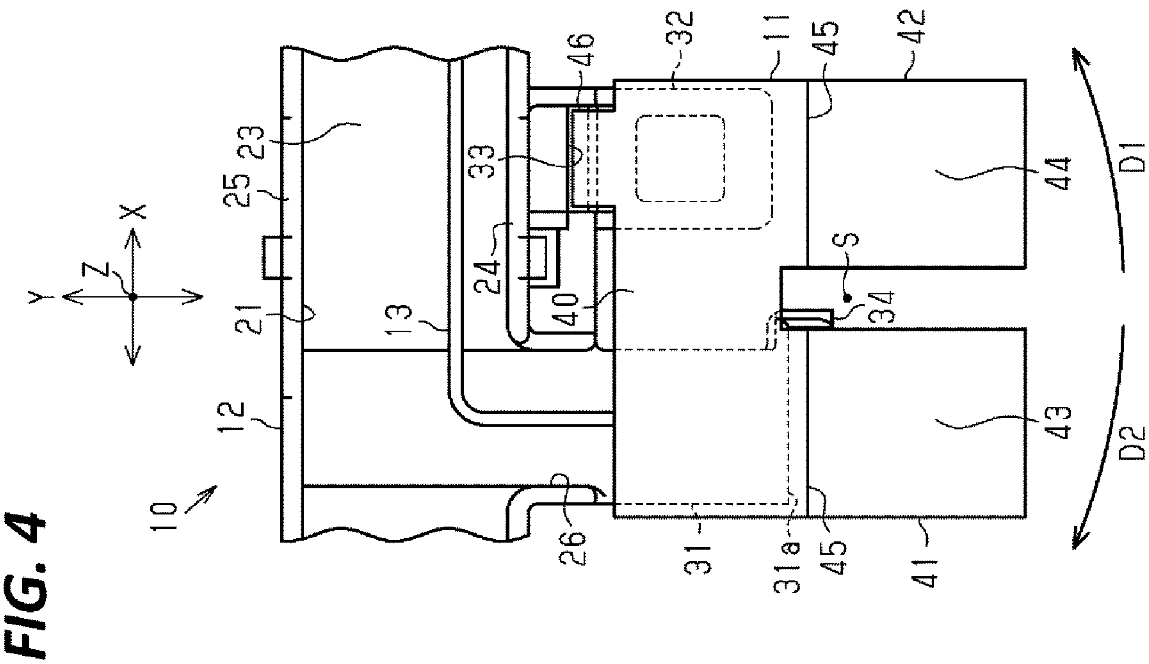
FIG. 4 is an enlarged plan view of a portion of the battery wiring module shown in FIG. 1.

As shown in FIGS. 1 and 2, the battery wiring module 10 includes a plurality of plate-shaped bus bars 11 connected to electrode terminals (not shown) of the battery cells C, the case 12 that holds the plurality of bus bars 11, and a plurality of electric wires 13. Note that the electric wires 13 are not shown in FIG. 1. Also, the battery wiring module 10 includes a cover 14 that covers an upper portion of the later-described wire insertion portion 21 of the case 12. Note that FIGS. 2 and 4 are plan views illustrating states in which the cover 14 is removed.

As shown in FIG. 2, the plurality of bus bars 11 are aligned on each of the two sides in the width direction Y of the case 12, along the longitudinal direction X of the case 12, for example. Each bus bar 11 is connected to an electrode terminal (not shown) provided on an upper surface of the corresponding battery cell C.

The electric wires 13 are electrically connected to the corresponding bus bars 11. The electric wires 13 are inserted into the case 12 along the longitudinal direction X. Some of the plurality of electric wires 13 are led to the outside of the case 12 from a first wire lead-out portion 15 provided in one end portion in the longitudinal direction X of the case 12, and the plurality of remaining electric wires 13 are lead to the outside of the case 12 from a second wire lead-out portion 16 provided in the other end portion in the longitudinal direction X of the case 12.

Case 12

As shown in FIG. 2, the case 12 includes one or more wire insertion portions 21 through which the electric wires 13 are passed. The wire insertion portion 21 has a groove-like shape that is open on the upper side in the height direction Z. Also, the wire insertion portions 21 extend along the longitudinal direction X of the case 12. Note that two wire insertion portions 21 are provided side-by-side in the width direction Y in the case 12 according to this embodiment, for example. Also, the case 12 includes a plurality of connection portions 22 that connect two wire insertion portions 21 to each other. Note that the case 12 is an injection molded component made from a synthetic resin material, for example. Also, the case 12 has a structure in which the case 12 is divided into a plurality of portions in the longitudinal direction X, for example.

Each wire insertion portion 21 includes a bottom wall portion 23, and a first side wall portion 24 and a second side wall portion 25 that extend upward from the bottom wall portion 23. The wire insertion portion 21 has a groove-like shape that is open on the upper side in the height direction Z due to the bottom wall portion 23, the first side wall portion 24, and the second side wall portion 25. The first side wall portion 24 and the second side wall portion 25 face each other in the width direction Y of the case 12. Note that the width direction of the wire insertion portion 21 is a direction in which the first side wall portion 24 and the second side wall portion 25 face each other, and the width direction of the wire insertion portion 21 coincides with the width direction Y of the case 12 in this embodiment. Also, the lengthwise direction of the wire insertion portion 21 coincides with the longitudinal direction X of the case 12.

In each wire insertion portion 21, the first side wall portion 24 is located outside the second side wall portion 25 in the width direction Y. The connection portion 22 connects the second side wall portions 25 of two wire insertion portions 21 to each other. In each wire insertion portion 21, the electric wires 13 are passed through between the first side wall portion 24 and the second side wall portion 25 along the lengthwise direction of the wire insertion portion 21.

The first side wall portion 24 includes a plurality of opening portions 26 that are open in the width direction Y of the case 12. Each opening portion 26 is open toward the corresponding bus bar 11. The plurality of opening portions 26 are present in the first side wall portion 24 along the longitudinal direction X of the case 12. The electric wires 13, which are to pass through the wire insertion portion 21, are passed outward in the width direction of the wire insertion portion 21 through the opening portion 26, i.e., are passed to the bus bar 11 side.

First Seat Portion 31 and Second Seat Portion 32

Figure 3:
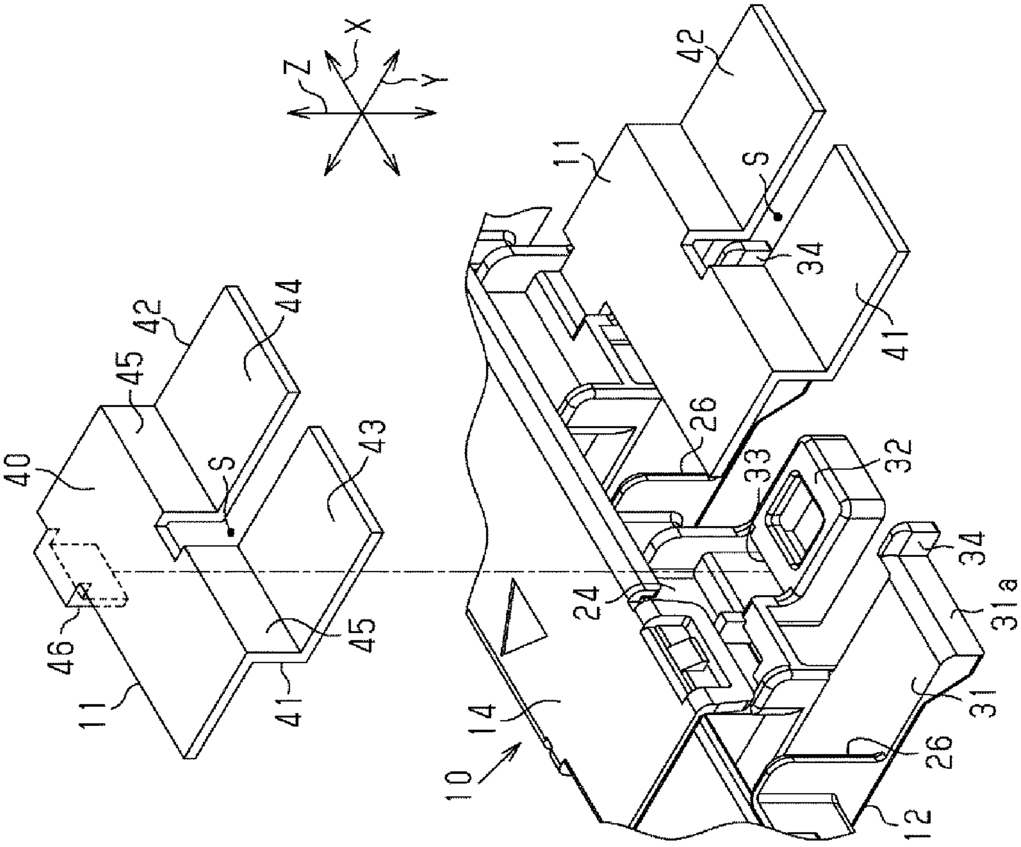
FIG. 3 is an enlarged exploded perspective view of a portion of the battery wiring module shown in FIG. 1.

As shown in FIGS. 3 and 4, the case 12 includes first seat portions 31 and second seat portions 32 on which the bus bars 11 are placed. Each of the first seat portions 31 and the second seat portions 32 is provided outside the first side wall portion 24 in the width direction Y. The first seat portion 31 extends from the wire insertion portion 21 outward in the width direction Y. The first seat portion 31 is located outside the opening portion 26 in the width direction Y. The second seat portion 32 extends from the first side wall portion 24 outward in the width direction Y. The first seat portion 31 and the second seat portion 32 are provided in parallel and spaced apart from each other in the longitudinal direction X of the case 12.

Each of the first seat portions 31 and the second seat portions 32 is not provided with a wall surrounding the bus bar 11 placed on the seat portions 31 and 32. That is, both sides of the first seat portion 31 and both sides of the second seat portion 32 in the longitudinal direction X, and the outer sides of the first seat portion 31 and the second seat portion 32 in the width direction Y are open.

The case 12 includes a plurality of holding portions 33 that hold the bus bars 11. Each holding portion 33 is provided as a single body with the first side wall portion 24, for example. Also, the holding portion 33 is provided on the first side wall portion 24 so as to be aligned with the opening portion 26 in the lengthwise direction of the wire insertion portion 21. Each holding portion 33 is provided at the base portion of the corresponding second seat portion 32, for example. The holding portion 33 is a hole that passes through the second seat portion 32 in the height direction Z, or a recess that is recessed in the height direction Z, for example. The holding portion 33 includes a locking portion (not shown) that locks to the later-described held portion 46 of the bus bar 11 in the height direction Z.

Bus Bar 11

Each bus bar 11 includes a placement portion 40 placed on the seat portions 31 and 32, and the first extension portion 41 and the second extension portion 42 that extend from the placement portion 40. The placement portion 40 is placed on the seat portions 31 and 32 so as to extend over the first seat portion 31 and the second seat portion 32. Note that the electric wire 13 pulled to the bus bar 11 side through the opening portion 26 is connected to a portion of the placement portion 40 of the bus bar 11 that is placed on the first seat portion 31. Note that the bus bar 11 is disposed such that the plate thickness direction of the bus bar 11 extends in the height direction Z, for example. In other words, the bus bar 11 is disposed such that the plate surface direction of the bus bar 11, i.e., the direction extending along the surface of the bus bar 11, is orthogonal to the height direction Z.

The first extension portion 41 and the second extension portion 42 extend from the placement portion 40 outward in the width direction Y of the case 12. The first extension portion 41 and the second extension portion 42 are provided in parallel along the direction in which the battery cells C are provided in parallel to each other, i.e., along the longitudinal direction X of the case 12. A gap S is provided between the first extension portion 41 and the second extension portion 42 in the longitudinal direction X of the case 12. The first extension portion 41 is located outside the opening portion 26 in the width direction of the wire insertion portion 21. The second extension portion 42 is located outside the holding portion 33 in the width direction of the wire insertion portion 21.

The first extension portion 41 includes a first connection portion 43 connected to an electrode terminal (not shown) of the corresponding battery cell C. The second extension portion 42 includes a second connection portion 44 connected to an electrode terminal (not shown) of the corresponding battery cell C. The first connection portion 43 is connected to one of battery cells C that are adjacent to each other in the longitudinal direction X of the case 12, and the second connection portion 44 is connected to the other of the adjacent battery cells C. Note that the first connection portion 43 and the second connection portion 44 are connected to the electrode terminals of the corresponding battery cells C through welding or the like, for example.

The first extension portion 41 and the second extension portion 42 each have a step portion 45 that is displaced downward in the height direction Z. The first connection portion 43 is located below the placement portion 40 via the step portion 45. The second connection portion 44 is located below the placement portion 40 via the step portion 45.

Also, the bus bar 11 includes a held portion 46 held by the holding portion 33 of the case 12. The held portion 46 extends downward in the height direction Z from the placement portion 40. The held portion 46 is inserted into the holding portion 33 in the height direction Z, and is locked to the locking portion of the holding portion 33 in the height direction Z.

Regulating Portion 34

The case 12 includes a regulating portion 34 that extends from each first seat portion 31. Each regulating portion 34 is provided at one end in the longitudinal direction X of an outer end portion of the first seat portion 31 in the width direction Y, i.e., a leading end portion 31*a* extending in the width direction Y, for example. The regulating portion 34 enters the gap S provided between the first extension portion 41 and the second extension portion 42. Also, the regulating portion 34 is in contact with one end portion in the longitudinal direction X of the first extension portion 41. That is, the regulating portion 34 is in contact with the bus bar 11 in a direction extending in the plate surface direction of the bus bar 11. Further, the regulating portion 34 is in contact with the step portion 45 of the first extension portion 41, for example. Also, the leading end portion 31*a* in the width direction Y of the first seat portion 31 is in contact with the step portion 45 of the first extension portion 41 in the width direction Y, for example.

Effects of this embodiment will be described.

As shown in FIG. 4, when the regulating portion 34 comes into contact with the inner end surface of the first extension portion 41 of the bus bar 11, the regulating portion 34 regulates rotation of the bus bar 11 about the holding portion 33 in an arrow direction D1 along the plate surface direction of the bus bar 11. Also, when the leading end portion 31*a* of the first extension portion 41 comes into contact with the step portion 45 of the first extension portion 41 of the bus bar 11, the leading end portion 31*a* regulates rotation of the bus bar 11 about the holding portion 33 in an arrow direction D2, which is a direction opposite to the arrow direction D1.

Effects of this embodiment will be described.

(1) The regulating portions 34 regulate rotation of the bus bars 11 about the holding portions 33 when the bus bars 11 are viewed in the plate thickness direction. As a result, it is possible to suppress rattling of the bus bars 11 in the same rotation direction. Therefore, the case 12 can stably hold the bus bars 11.

(2) The case 12 includes the first seat portions 31 on which the corresponding bus bars 11 are placed. Each regulating portion 34 extends from the corresponding first seat portion 31 and is configured to come into contact with the corresponding bus bar 11 along the plate surface direction of the bus bar 11. According to this configuration, when the regulating portion 34 that extends from the first seat portion 31 comes into contact with the bus bar 11 in the direction that extends in the plate surface direction of the bus bar 11, rotation of the bus bar 11 about the holding portion 33 can be regulated.

(3) The case 12 includes the wire insertion portions 21 through which the electric wires 13 that are electrically connected to the bus bars 11 are passed, respectively. Each wire insertion portion 21 includes the bottom wall portion 23, and the first side wall portion 24 and the second side wall portion 25 that extend from the bottom wall portion 23 and face each other in the width direction of the wire insertion portion 21. Also, the first seat portion 31 and the second seat portion 32 are provided outside in the width direction of the first side wall portion 24, and the first seat portion 31 and the second seat portion 32 are not provided with a wall surrounding the bus bar 11 placed on the seat portions 31 and 32. This configuration is advantageous for reducing the weight of the case 12 because no wall, which surrounds the bus bar 11 placed on the seat portions 31 and 32, is provided. Also, even when a wall that surrounds the bus bar 11 placed on the seat portions 31 and 32 is not provided, the bus bar 11 can be stably held by the holding portion 33 and the regulating portion 34 of the case 12 without rattling.

(4) The secondary battery BT includes a plurality of battery cells C that are provided in parallel in one direction. Each bus bar 11 includes the placement portion 40 placed on the seat portions 31 and 32, and the first extension portion 41 and the second extension portion 42 that extend from the placement portion 40. The first extension portion 41 and the second extension portion 42 are provided in parallel in the direction in which the battery cells C are provided in parallel to each other. The first extension portion 41 includes the first connection portion 43 that is connected to one of battery cells C that are adjacent to each other, and the second extension portion 42 includes the second connection portion 44 that is connected to the other of the battery cells C that are adjacent to each other. Also, the regulating portion 34 is configured to be able to come into contact with the first extension portion 41. According to this configuration, when the regulating portion 34 that extends from the first seat portion 31 comes into contact with the first extension portion 41 of the bus bar 11, rotation of the bus bar 11 about the holding portion 33 can be regulated.

(5) The regulating portion 34 is located between the first extension portion 41 and the second extension portion 42. According to this configuration, when the regulating portion 34 located between the first extension portion 41 and the second extension portion 42 of the bus bar 11 comes into contact with the first extension portion 41, rotation of the bus bar 11 about the holding portion 33 can be regulated.

(6) Each first side wall portion 24 includes the opening portion 26 for passing the electric wire 13 to the bus bar 11 side. Each holding portion 33 is provided on the first side wall portion 24 so as to be aligned with the opening portion 26 in the lengthwise direction of the wire insertion portion 21. The first extension portion 41 is located outside the opening portion 26 in the width direction of the wire insertion portion 21, and the second extension portion 42 is located outside the holding portion 33 in the width direction of the wire insertion portion 21. According to this configuration, the regulating portion 34 comes into contact with the first extension portion 41 located farther away from the holding portion 33. If a gap resulting from manufacturing tolerance or the like is present between the regulating portion 34 and the bus bar 11, the bus bar 11 may rattle in the direction of rotation about the holding portion 33. However, the farther the position where the regulating portion 34 and the bus bar 11 comes into contact with each other is from the holding portion 33, the less the bus bar 11 rattles. Therefore, by bringing the regulating portion 34 into contact with the first extension portion 41 located farther away from the holding portion 33, it is possible to further suppress rattling of the bus bar 11 in the direction in which the bus bar 11 rotates about the holding portion 33.

This embodiment can be changed as follows and carried out. Any combination of this embodiment and the following modified examples can be made as long as there is no technical contradiction.

The regulating portion 34 may be configured to come into contact with the second extension portion 42. Also, the regulating portion 34 may be configured to come into contact with both the first extension portion 41 and the second extension portion 42.

Although the regulating portion 34 is provided on the first seat portion 31 in the above embodiment, the present invention is not limited to this, and the regulating portion 34 may be provided on the second seat portion 32.

Although the regulating portion 34 comes into contact with the inner end surface of the first extension portion 41 in the longitudinal direction X of the case 12 in the above embodiment, the present invention is not limited to this, and a configuration may be adopted in which the regulating portion 34 comes into contact with the outer end surface of the first extension portion 41.

Although the seat portion on which the placement portion 40 of the bus bar 11 is placed is divided into the first seat portion 31 and the second seat portion 32 in the above embodiment, the present invention is not limited to this, and a configuration may be adopted in which the placement portion 40 is placed on one seat portion.

The electric wire 13 may be directly connected to the bus bar 11. Also, the electric wire 13 may be connected to the bus bar 11 via a metal terminal.

This disclosure encompasses the following aspects. Not for limitation but for assistance in understanding, the reference numerals of the representative components in the representative embodiment are provided. Some of the items described in the following aspects may be omitted, or some of the items described in the aspects may be selected or extracted and combined.

[Appendix 1] A battery wiring module (10) according to several aspects of this disclosure includes:

one or more plate-shaped bus bars (11) to be connected to a secondary battery (BT); and a case (12) that holds the one or more bus bars (11), wherein the case (12) includes:

one or more engagement portions (33) (holding portions 33) that engage with the corresponding bus bars (11), and one or more regulating portions (34) that regulate movement of the corresponding bus bars (11) along a plate surface direction of the corresponding bus bars (11).

[Appendix 2] In several implementation examples, the secondary battery (BT) may include a plurality of battery cells (C) that are aligned in a longitudinal direction of the case, the wire wiring module (10) may include a plurality of bus bars (11) that are aligned in the longitudinal direction.

[Appendix 3] In several implementation examples, the bus bars (11) may each include an engagement claw (held portion 46) that engages with the engagement portion (33) and protrudes from an outer edge that extends in the longitudinal direction of the corresponding bus bar (11) in a direction orthogonal to a plate surface of the corresponding bus bar (11).

[Appendix 4] In several implementation examples, the engagement portion (33) may be a recess capable of accommodating the engagement claw (46), or a through-hole through which the engagement claw (46) is capable of passing.

[Appendix 5] In several implementation examples, the engagement claw (46) may be disposed between the center and a first end in the longitudinal direction of the bus bar (11).

[Appendix 6] In several implementation examples, the bus bars (11) may each include a first connection portion and a second connection portion (43, 44) that are respectively connected to the corresponding two battery cells, and that are aligned in the longitudinal direction.

[Appendix 7] In several implementation examples, the bus bars (11) may each include a rectangular plate-shaped placement portion (40) that extends in the longitudinal direction and includes the engagement claw (46), the first and second connection portions (43, 44), and two step portions (45), in which the two step portions (45) may extend between the placement portion (40) and the first and second connection portions (43, 44), and the step portions (45) may each be a wall portion that is perpendicular to the placement portion (40) and the corresponding connection portion (43, 44).

[Appendix 8] In several implementation examples, the engagement claw (46) may have a plate shape that is parallel to the two step portions (45).

[Appendix 9] In several implementation examples, the regulating portion (34) may be disposed between the two step portions (45).

[Appendix 10] In several implementation examples, the case may include first and second seat portions (31, 32) that are aligned in the longitudinal direction, the first seat portion (31) may include a leading end surface (31*a*) that is in contact with one of the two step portions (45) and the regulating portion (34) that intersects the leading end surface (31*a*), and the second seat portion (32) may include the engagement portion (33).

[Appendix 11] In several implementation, the step portion (45) that is in contact with the leading end surface (31*a*) may be disposed between a second end in the longitudinal direction of the bus bar (11) and the regulating portion (34).

LIST OF REFERENCE NUMERALS

10 Battery wiring module
11 Bus bar
12 Case
13 Electric wire
14 Cover
15 First wire lead-out portion
16 Second wire lead-out portion
21 Wire insertion portion
22 Connection portion
23 Bottom wall portion
24 First side wall portion
25 Second side wall portion
26 Opening portion
31 First seat portion (seat portion)
31*a* Leading end portion
32 Second seat portion (seat portion)
33 Holding portion
34 Regulating portion
40 Placement portion
41 First extension portion
42 Second extension portion
43 First connection portion
44 Second connection portion
45 Step portion
46 Held portion
BT Secondary battery
C Battery cell
D1 Arrow direction
D2 Arrow direction
S Gap
X Longitudinal direction of case
Y Width direction of case
Z Height direction of case

What is claimed is:

1. A battery wiring module comprising:

a plate-shaped bus bar having a multilayer structure in which a step portion is provided, and including a notch formed through the step portion to extend to an end of the bus bar, the bus bar being connected to a secondary battery; and a case that holds the bus bar, wherein the case includes:

a holding portion that holds the bus bar; and a regulating portion protruding through the notch of the bus bar in a width direction of the case, and configured to contact the step portion of the bus bar to regulate rotation of the bus bar about the holding portion when the bus bar is viewed in a plate thickness direction of the bus bar.

2. The battery wiring module according to claim 1, wherein the case includes a seat portion on which the bus bar is placed, the regulating portion extends from the seat portion, and the regulating portion is configured to be capable of coming into contact with the bus bar in a direction extending along a plate surface direction of the bus bar through the notch.

3. The battery wiring module according to claim 2, wherein the case includes a wire insertion portion through which an electric wire to be electrically connected to the bus bar is passed, the wire insertion portion includes a bottom wall portion, and a first side wall portion and a second side wall portion that extend from the bottom wall portion and face each other in a width direction of the wire insertion portion, the seat portion is provided outside the first side wall portion in the width direction, and the seat portion is not provided with a wall that surrounds the bus bar placed on the seat portion.

4. The battery wiring module according to claim 3, wherein the secondary battery includes a plurality of battery cells that are provided in parallel in one direction, the bus bar includes a placement portion placed on the seat portion, and a first extension portion and a second extension portion that extend from the placement portion in the width direction of the case with the notch formed therebetween, the first extension portion and the second extension portion are provided in parallel along a direction in which the battery cells are provided in parallel, the first extension portion includes a first connection portion that is connected to one of the battery cells that are adjacent to each other, the second extension portion includes a second connection portion that is connected to the other of the battery cells that are adjacent to each other, and the regulating portion is configured to be capable of coming into contact with at least one of the first extension portion and the second extension portion through the notch.

5. The battery wiring module according to claim 4, wherein the regulating portion is located between the first extension portion and the second extension portion through the notch.

6. The battery wiring module according to claim 4, wherein the first side wall portion includes an opening portion configured to pass the electric wire to the bus bar side, the holding portion is provided on the first side wall portion so as to be aligned with the opening portion in a lengthwise direction of the wire insertion portion, the first extension portion is located outside the opening portion in the width direction, the second extension portion is located outside the holding portion in the width direction, and the regulating portion is configured to be capable of coming into contact with the first extension portion through the notch.

7. The battery wiring module according to claim 2, wherein a leading end in a width direction of the seat portion is in contact with the step portion in the width direction of the seat portion.

8. The battery wiring module according to claim 4, wherein the regulating portion contacts the step portion of the bus bar at a position corresponding to a gap between the first extension portion and the second extension portion of the bus bar.

* * * * *